April 11, 1939.    F. W. JONES    2,154,095
INTERNAL COMBUSTION ENGINE
Filed Nov. 17, 1936    5 Sheets-Sheet 1

INVENTOR
FREDERICK W. JONES
BY
ATTORNEYS

April 11, 1939.　　　F. W. JONES　　　2,154,095
INTERNAL COMBUSTION ENGINE
Filed Nov. 17, 1936　　　5 Sheets-Sheet 2

INVENTOR
FREDERICK W. JONES
BY
ATTORNEYS

April 11, 1939.  F. W. JONES  2,154,095
INTERNAL COMBUSTION ENGINE
Filed Nov. 17, 1936   5 Sheets-Sheet 3

INVENTOR
FREDERICK W. JONES
BY
ATTORNEYS

April 11, 1939.　　　F. W. JONES　　　2,154,095

INTERNAL COMBUSTION ENGINE

Filed Nov. 17, 1936　　5 Sheets-Sheet 4

INVENTOR

FREDERICK W. JONES

BY

ATTORNEYS

April 11, 1939.  F. W. JONES  2,154,095
INTERNAL COMBUSTION ENGINE
Filed Nov. 17, 1936    5 Sheets-Sheet 5

INVENTOR
FREDERICK W. JONES
BY
ATTORNEYS

Patented Apr. 11, 1939

2,154,095

UNITED STATES PATENT OFFICE 2,154,095

INTERNAL COMBUSTION ENGINE

Frederick W. Jones, Milwaukee, Wis.

Application November 17, 1936, Serial No. 111,245

5 Claims. (Cl. 123—14)

This invention pertains to internal combustion engines, and more particularly to a rotary engine in which the operative steps of expansion, intake, exhaust and compression occur during two revolutions of the rotor.

The invention has primarily for its object to produce an exceedingly simple and efficient engine of the foregoing type, utilizing a rotary piston mounted on the crank shaft, and control valves operably connected with the crank shaft to effect the operative cycles, namely, expansion, intake, exhaust, and compression, through two revolutions of the rotor or piston.

Incidental to the foregoing, a more specific object of the invention resides in the provision of an engine having the foregoing characteristics, and provided with a plurality of abutments automatically actuated by the rotor in effecting the operative cycles.

A more specific object resides in the provision of rotary valves operatively connected with the crank shaft of the engine through suitable gearing for controlling not only the cycles of operation, but also designed to relieve ineffectual pressure upon the rotor.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Figure 2:
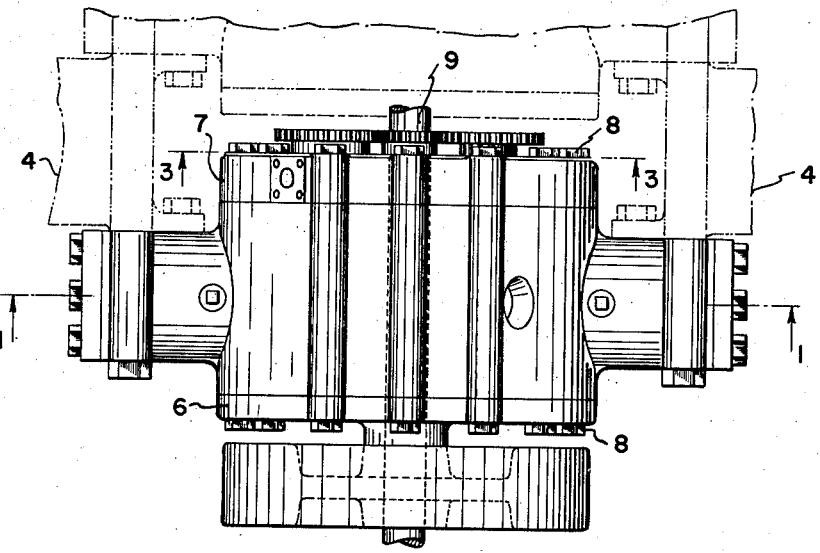
Figure 2 is a plan view of a single cylinder, and indicates in dot and dash lines the manner in which a plurality of cylinders may be coupled together.

Referring now more particularly to the accompanying drawings, which, for the purpose of simplicity, illustrate a single cylinder, it will be appreciated that the invention is applicable to any number of cylinders disposed side by side, and provided with a common crank shaft, as indicated in Figure 2. Furthermore, while the disclosure of the invention provides for water cooling, it is to be understood that the same can be accomplished in other ways, if desired, without departing in any way from the essential features of the invention.

Figure 1:
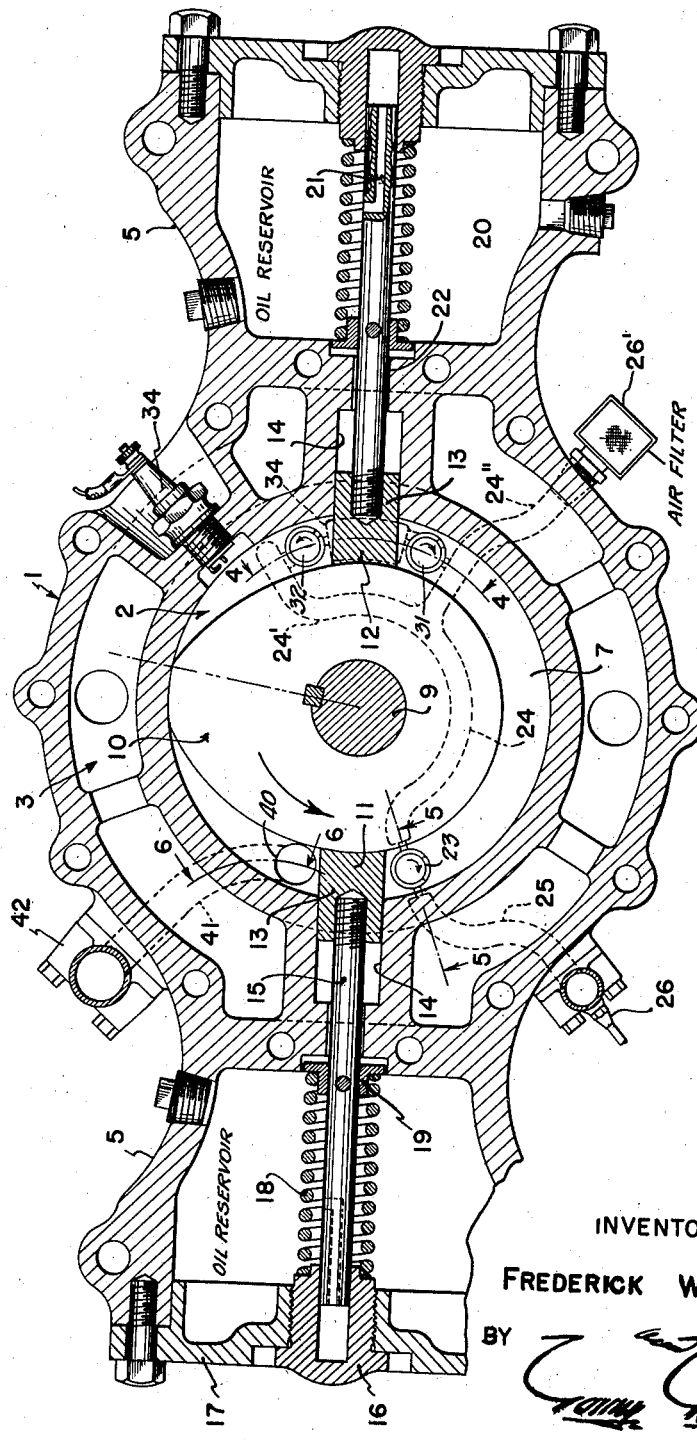
Figure 1 is a transverse cross-sectional view of an engine constructed in accordance with one form of the present invention, the same being taken on line 1—1 of Figure 2.

With particular reference to Figures 1 and 2, the numeral 1 designates a block provided with a transverse annular compartment 2, which functions similarly to the cylinder in a conventional reciprocative type engine. The block is also provided with a water jacket 3, through which water may be circulated in the usual manner, to effect cooling of the block. While any mounting for the block may be employed, in the present engine it is proposed to fasten the same to a pair of laterally extending brackets 4 (shown in dot and dash lines in Figure 2), which may be suitably attached to a supporting frame (not shown).

Figure 4:
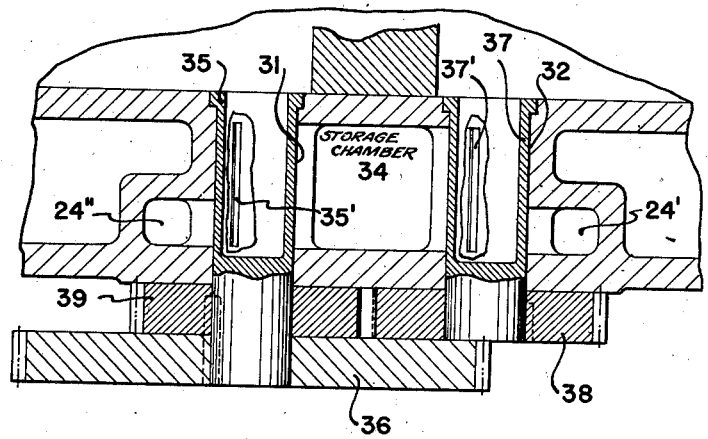
Figure 4 is a fragmentary section taken on the line 4—4 of Figure 1.
Figure 5:
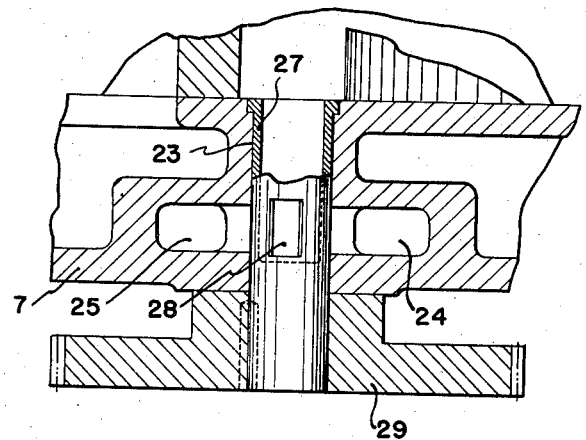
Figure 5 is a fragmentary section taken on the line 5—5 of Figure 1.
Figure 6:
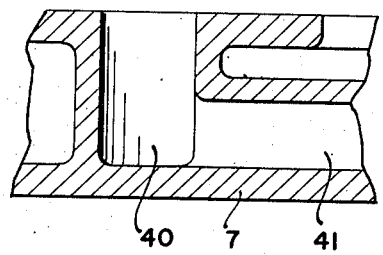
Figure 6 is a detail section taken on the line 6—6 of Figure 1.

The block 1 is provided with laterally projecting bosses 5 opposed to each other, and which serve to house the shanks and spring-actuating means of a pair of spaced abutments to be hereinafter described. The sides of the block are closed by suitable heads 6 and 7, respectively, the same being bolted to the block by means of stud bolts 8. As best shown in Figures 4, 5 and 6, the head 7 is provided with various fluid ducts to be described, and has journaled therein the rotary valves controlling the same.

A shaft 9, which is the equivalent of the crank shaft, or power shaft, of a conventional reciprocative engine, is journaled in the heads 6 and 7, and secured on the shaft 9 is a rotor 10 operating within the annular compartment 2, and functioning as a piston in cooperation with the spaced abutments 11 and 12, respectively. The rotor 10 is of the usual eccentric configuration, including a radial enlargement, the leading face of which effects compression and exhaust, while the following face is operative during expansion and suction cycles.

Inasmuch as the abutments 11 and 12 are similar in construction, the description of the same will be confined to one abutment, and, as best shown in Figure 1, it will be noted that each abutment comprises a head 13 slidably journaled within a recess 14 formed in the block and projecting into the annular compartment 2 for engagement with the periphery of the rotor 10. Each of the abutment heads 13 has secured thereto a stem 15, the outer end of which is slidably guided in a closed bushing 16 threaded into a cap 17 secured to the outer end of the boss 5 and forming a closure therefor. An expansible coil spring 18 surrounding the stem 15, is disposed between the bushing 16, and a washer 19 fastened to the stem 15, serves to urge the abutment head 13 into engagement with the periphery of the rotor 10.

To provide for lubrication of the abutments 11 and 12, and other working members, each of the bosses 5 includes a compartment 20 for reception of a suitable lubricant. As best shown in Figure 1 the abutment stems 15 are provided with ducts 21 communicating with the chambers 20 and their outer ends, and serving to lubricate the journals in the threaded bushings 16. It will also be noted that an enlarged opening 22 provided in the block, and through which the stem 15 passes, will serve to admit lubricant to the recess 14, thus lubricating the abutment head 13.

As best shown in Figures 1 and 5, the head 7 is provided with an inlet port 23 communicatnig with the compartment 2 adjacent the forward face of the abutment 11. Communicating with the port 23 are ducts 24 and 25, respectively. The duct 25 leads to a carburetor connection 26, the carburetor, which is not shown, being of any conventional type. The duct 24 is provided with two branches 24' and 24", the latter of which communicates with an air strainer 26' to admit air through the port 23 to relieve back pressure upon the following face of the rotor, as will be explained more in detail during the description of the operation of the engine.

The port 23 is controlled by a rotary valve 27 provided with an opening 28 arranged for alternative alinement with the ducts 24 and 25, upon rotation of the valve 27, the latter being driven through a gear 29 mounted on its outer end, and meshing with a gear 30 secured to the crank shaft 9.

In addition to the port 23, the head 7 is also provided with ports 31 and 32, respectively, and communicating with the annular chamber 2 upon opposite sides of the abutment 12, as best shown in Figures 1 and 2. Disposed between the ports 31 and 32, and communicating therewith, is a storage chamber 34 into which the fuel charge is compressed, and thereafter released into the chamber 2 for the expansion stroke upon ignition by the spark plug 34. Also, as best shown in Figure 4, the ducts 24' and 24" communicate respectively with the ports 32 and 31.

Figure 3:
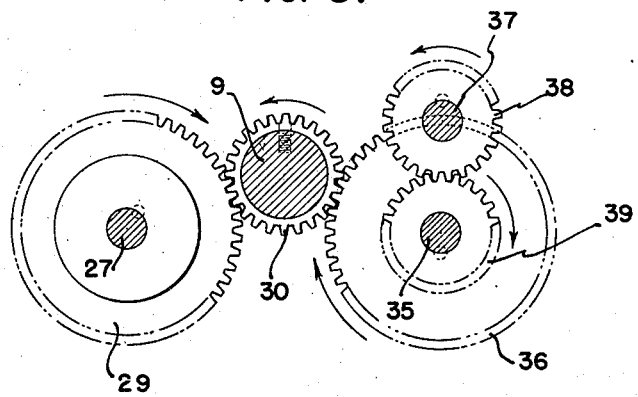
Figure 3 is a detail section taken on the line 3—3 of Figure 2, indicating the gearing connection between the crank shaft and the control valves.

Opening and closing of the port 32 with reference to the storage chamber 34, and the duct 24", is controlled by a rotary valve 35 provided with an elongated opening 35', and a gear 36, meshing with the gear 30 on the engine shaft 9. The port 32 is controlled by a similar rotary valve 37 provided with an opening 37' and a gear 38, meshing with a gear 39, mounted on the outer end of the valve 35. Obviously, as best shown in Figure 3, the valves 27 and 35 are geared for one revolution to two of the crank shaft, and through the one-to-one gear ratio between the valves 35 and 37 these valves will rotate in synchronism.

Lastly, the head 7 is provided with an exhaust port 40 communicating with a duct 41 leading to either atmosphere or a muffler (not shown) fastened to the fitting 42 secured to the block.

Figure 7:
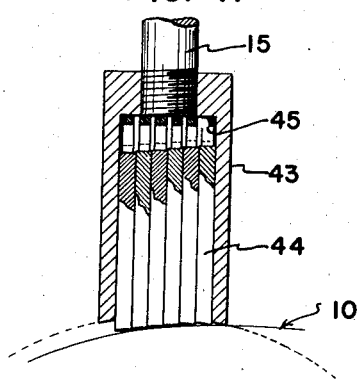
Figure 7 is a detail section through a modified form of abutment.
Figure 8:
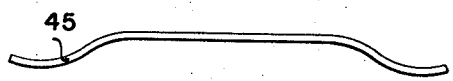
Figure 8 is an elevation of one of the springs employed in the modified abutment illustrated in Figure 7.

The modified form of abutment disclosed in Figure 7, designed to provide a multiple point contact with the periphery of the rotor, comprises a hollow head 43 in which is mounted a plurality of sliding gates 44, which are independently urged into contact with the periphery of the rotor by flat springs 45. Due to the variation in the working face of the rotor, it will be apparent that the abutments shown in Figure 7 will provide more efficient seal between the abutment and rotor, due to the independent action of the gates 44, permitting the same to follow the periphery of the rotor, and, as stated, provide a multiple point contact.

Figure 9:
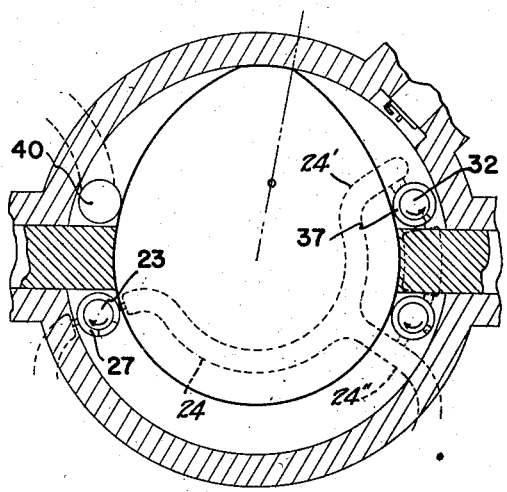
Figure 9 is a diagrammatic illustration showing the relative position of the various elements of the engine upon firing.

Considering now the operation of the present invention, in connection with the foregoing explanation, particular reference will be had to Figures 9 to 15, inclusive, which illustrate the various moving elements of the engine in relative position during the operative cycle. In Figure 9 it may be assumed that a fuel charge has been introduced into the compartment 2 ahead of the abutment 12, and behind the following face of the rotor. In this position of the rotor, the charge is fired, and due to the fact that the port 32 has been closed by the valve 37, expansion takes place until the rotor passes the exhaust port 40, which it is just about to do in that position illustrated in Figure 10. The rotor through momentum of the fly wheel continues to rotate past the abutment 11, and prior to reaching that position shown in Figure 11 the port 23 is opened to the duct 25, which communicates with a carburetor, and the charge is thereafter drawn into the compartment 2 through the suction action of the rotor. At the same time it will be noted that the port 31 is opened to the duct 24", which permits air ahead of the rotor to be expelled to the atmosphere through the air strainer 26', and thus relieve back pressure upon the rotor.

Figure 12:
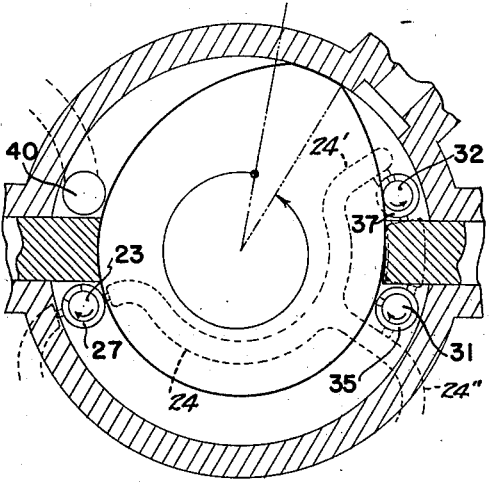
Figure 12 is a similar view showing the parts during completion of the exhaust stroke.
Figure 10:
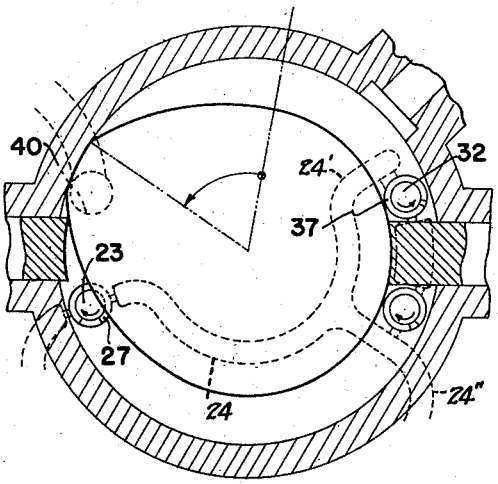
Figure 10 is a similar view illustrating the position of the parts just prior to completion of the expansion stroke, and start of exhaust.
Figure 11:
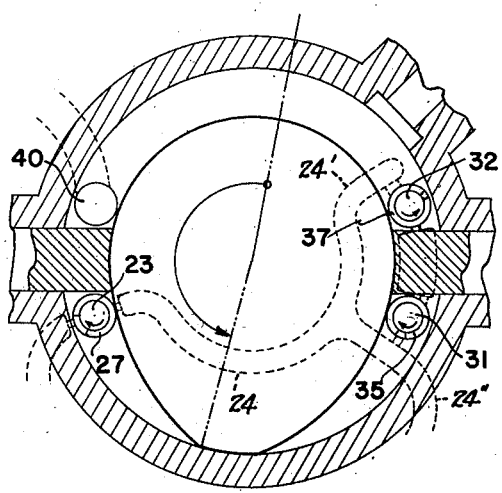
Figure 11 illustrates the position of the parts during the suction or intake stroke.

The continued operation carries the rotor to the position shown in Figure 12, and prior to passing the port 31, both the ports 31 and 32 are closed by means of their respective valves. Likewise, as the rotor passes the abutment 12, the fired charge is exhausted through the port 40, and the port 32 is opened to the duct 24' to relieve reduced pressure within the compartment, and consequently back pressure upon the rotor upon the exhaust stroke.

Figure 13:
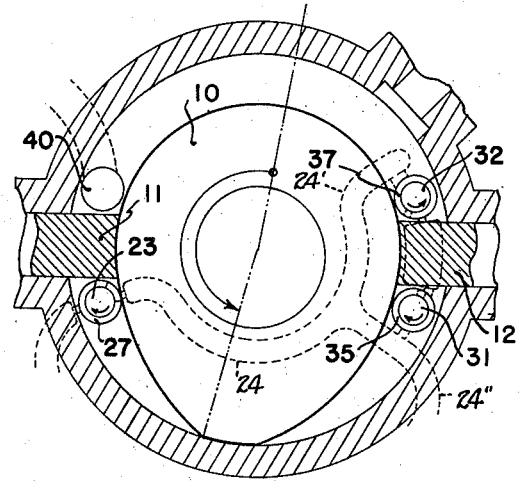
Figure 13 is a similar view of the parts during the compression stroke.

Rotation of the rotor continues, and during that portion of the stroke illustrated in Figure 13, compression is occurring ahead of the rotor, while the port 23 is opened to the duct 24 to relieve back pressure upon the rotor.

Figure 16:
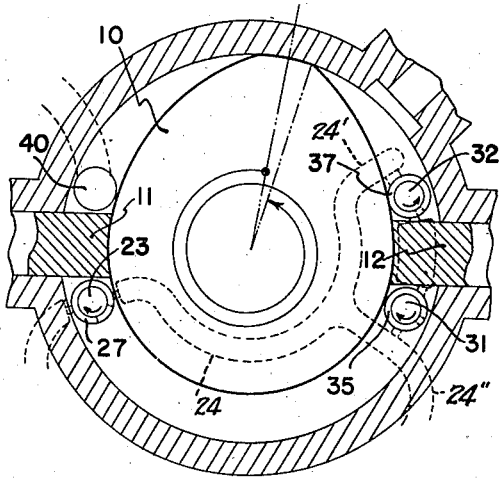
Figure 16 is a similar view upon completion of charging the compression chamber, and just prior to firing.
Figure 14:
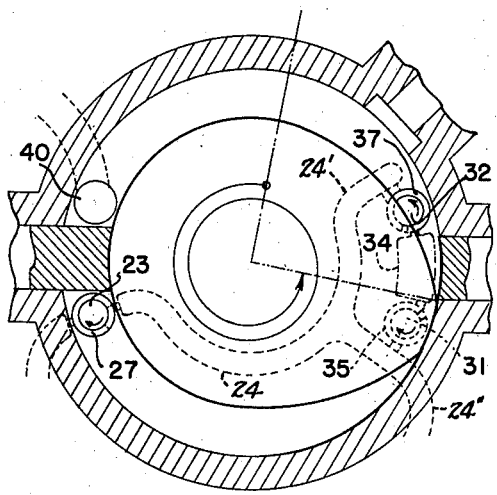
Figure 14 is a similar view of the parts in their position when the charge is compressed in the storage chamber.
Figure 15:
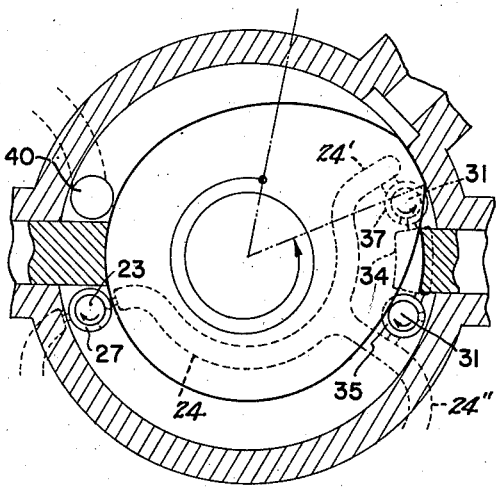
Figure 15 is a similar view, showing the charge about to be admitted to the expansion chamber.

During the compression stroke, it will be noted that the valve 37 is closed, while the port 31 has been opened to communication with the storage chamber 34, with the result that the charge is compressed in said chamber, and in that position of the rotor shown in Figure 14, both ports 31 and 32 have been entirely cut off with reference to the air ducts 24' and 24", and the storage chamber 34. The rotor then continues its movement, as shown in Figure 15, and upon reaching the position shown in Figure 16, the valve 37 which has previously been open, to admit the charge from the storage chamber 34 into the compartment 2, is then closed, and after a slight further movement of the rotor to the position indicated in Figure 9, firing of the charge takes place, as heretofore explained. The cycle is then repeated.

From the foregoing explanation considered in connection with the accompanying drawings, it will be apparent that an exceedingly simple and efficient motor has been devised having a minimum number of moving parts, and which provides for complete exhausting, and elimination of back pressure upon the rotor at all times with the exception of the compression stroke, and even during this operation reduced pressure at the rear of the rotor is relieved.

Another important feature of the invention resides in the fact that after the compressed charge has been introduced into the compartment 2, from the storage chamber 34, naturally a portion of the fuel charge will remain in the storage chamber, under the same compression as the charge delivered to the compartment 2. However, prior to firing, the valve 37 cuts off communication between the storage chamber 34 and the port 32. Consequently, upon the following compression stroke of the rotor, it becomes unnecessary to replenish that amount of fuel mixture trapped within the storage chamber.

While a specific form of the invention has been illustrated and described in considerable detail, it is to be understood that the principles of the invention may be variously embodied, and numerous conventional refinements may be employed, such as the use of packing rings for the rotor, and suitable packing strips for the reciprocated gates to insure the desired compression, and prevent passage of fuel.

I claim:

1. A rotary internal combustion engine comprising, a stationary casing provided with an annular compartment, a shaft journaled in said casing axially of said compartment, a rotor secured on said shaft within said compartment, a pair of opposed reciprocative abutments operable in said compartment and cooperating with said rotor to provide separate compression and expansion chambers, said compression chamber having a fuel mixture inlet port and said expansion chamber having an exhaust outlet, a fuel mixture storage compartment having an inlet communicating with the compression chamber and an outlet communicating with the expansion chamber, said storage compartment serving to receive the fuel charge from the compression chamber and deliver the same to the expansion chamber, means for igniting the charge in the expansion chamber, and independent valves for controlling the fuel mixture inlet valves for port and the storage compartment inlet and outlet to successively provide for expansion, intake, exhaust, and compression, during two complete revolutions of the rotor.

2. A rotary internal combustion engine comprising, a stationary casing provided with an annular compartment, a shaft journaled in said casing axially of said compartment, a rotor secured on said shaft within said compartment, a pair of opposed reciprocative abutments operable in said compartment and cooperating with said rotor to provide separate compression and expansion chambers, said compression chamber having a fuel mixture inlet port and said expansion chamber having an exhaust outlet, a fuel mixture storage compartment having an inlet communicating with the compression chamber and an outlet communicating with the expansion chamber, said storage compartment serving to receive the fuel charge from the compression chamber and deliver the same to the expansion chamber, means for igniting the charge in the expansion chamber, and independent valves for controlling the fuel mixture inlet port and the storage compartment inlet and outlet to successively provide for expansion, intake, exhaust, and compression, during two complete revolutions of the rotor, said compression and expansion chambers having communication with outside atmosphere to relieve back pressure upon said rotor during its intake and exhaust strokes.

3. A rotary internal combustion engine comprising, a stationary casing provided with an annular compartment, a shaft journaled in said casing axially of said compartment, a rotor secured on said shaft within said compartment, a pair of opposed reciprocative abutments operable in said compartment and cooperating with said rotor to provide separate compression and expansion chambers, said compression chamber having a fuel mixture inlet port and said expansion chamber having an exhaust outlet, a fuel mixture storage compartment having an inlet communicating with the compression chamber and an outlet communicating with the expansion chamber, said storage compartment serving to receive the fuel charge from the compression chamber and deliver the same to the expansion chamber, means for igniting the charge in the expansion chamber, and independent valves for controlling the fuel mixture inlet port and the storage compartment inlet and outlet to successively provide for expansion, intake, exhaust, and compression, during two complete revolutions of the rotor, said fuel mixture inlet port and the fuel mixture storage compartment communications with the compression and expansion chambers also having communication with outside atmosphere for relieving back pressure upon said rotor during its intake and exhaust strokes.

4. A rotary internal combustion engine comprising, a stationary casing provided with an annular compartment, a shaft journaled in said casing axially of said compartment, a rotor secured on said shaft within said compartment, a pair of opposed reciprocative abutments operable in said compartment and cooperating with said rotor to provide separate compression and expansion chambers, said compression chamber having a fuel mixture inlet port and said expansion chamber having an exhaust outlet, a fuel mixture storage compartment having an inlet communicating with the compression chamber and an outlet communicating with the expansion chamber, said storage compartment serving to receive the fuel charge from the compression chamber and deliver the same to the expansion chamber, means for igniting the charge in the expansion chamber, and independent valves for controlling the fuel mixture inlet port and the storage compartment inlet and outlet to successively provide for expansion, intake, exhaust, and compression, during two complete revolutions of said rotor, said fuel mixture inlet port and the fuel mixture storage compartment communications with the compression and expansion chambers also having communication with outside atmosphere, said communications to atmosphere being controlled by said valves to relieve back pressure upon said rotor during its intake and exhaust stroke.

5. A rotary internal combustion engine comprising, a stationary casing provided with an annular compartment, a shaft journaled in said casing axially of said compartment, a rotor secured on said shaft within said compartment, a pair of opposed reciprocative abutments operable in said compartment and cooperating with said rotor to provide separate compression and expansion chambers, a fuel mixture storage compartment having an inlet communicating with the compression chamber aand an outlet communicating with the expansion chamber, said storage compartment serving to receive the fuel charge from the compression chamber and deliver the same to the expansion chamber, means for igniting the charge in the expansion chamber, and independent rotary valves in geared connection with said shaft for controlling the fuel mixture inlet port and the storage compartment inlet and outlet to successively provide for expansion, intake, exhaust, and compression, during two complete revolutions of said rotor, said fuel mixture inlet port and the fuel mixture storage compartment communications with the compression and expansion chambers also having communication with outside atmosphere, said communications to atmosphere being controlled by said rotary valves to relieve back pressure upon said rotor during its intake and exhaust strokes.

FREDERICK W. JONES.